United States Patent [19]

Borell

[11] Patent Number: 5,265,559
[45] Date of Patent: Nov. 30, 1993

[54] BALL AND FLEXIBLE FLAG TAIL PET TOY STIMULATION AND TRAINING APPARATUS

[76] Inventor: James A. Borell, 3619 W. John Day, Kennewick, Wash. 99336

[21] Appl. No.: 946,175

[22] Filed: Sep. 16, 1992

[51] Int. Cl.⁵ ............................................. A01K 15/00
[52] U.S. Cl. ................................. 119/707; 273/58 K
[58] Field of Search ............. 119/29; 273/58 A, 58 C, 273/58 K

[56] References Cited

U.S. PATENT DOCUMENTS

| | | | |
|---|---|---|---|
| 1,582,983 | 5/1926 | Hamblet | 273/58 C |
| 3,470,845 | 10/1969 | Mignano | 273/58 C |
| 4,088,319 | 5/1978 | Clarke | 273/58 K X |
| 4,127,268 | 11/1978 | Lindgren | 273/58 C |
| 4,657,253 | 4/1987 | Lerner et al. | 273/58 K X |
| 4,696,472 | 9/1987 | Meyer | 273/58 A |

Primary Examiner—Robert P. Swiatek
Attorney, Agent, or Firm—Wells, St. John, Roberts, Gregory & Matkin

[57] ABSTRACT

A pet toy and training apparatus having a ball portion. A tail hold is connected to the ball portion to secure a flexible tail thereto. The tail hold is preferably a loop shaped member. The tail is formed into a bulge adjacent the tail hold. The tail is advantageously a strip of cloth fabric material tied into a knot about the tail hold. A dog, cat or other pet is attracted by flagging action of the tail when the apparatus is thrown and spins. A pet can easily pick up the toy by grasping the bulge in its mouth.

36 Claims, 5 Drawing Sheets

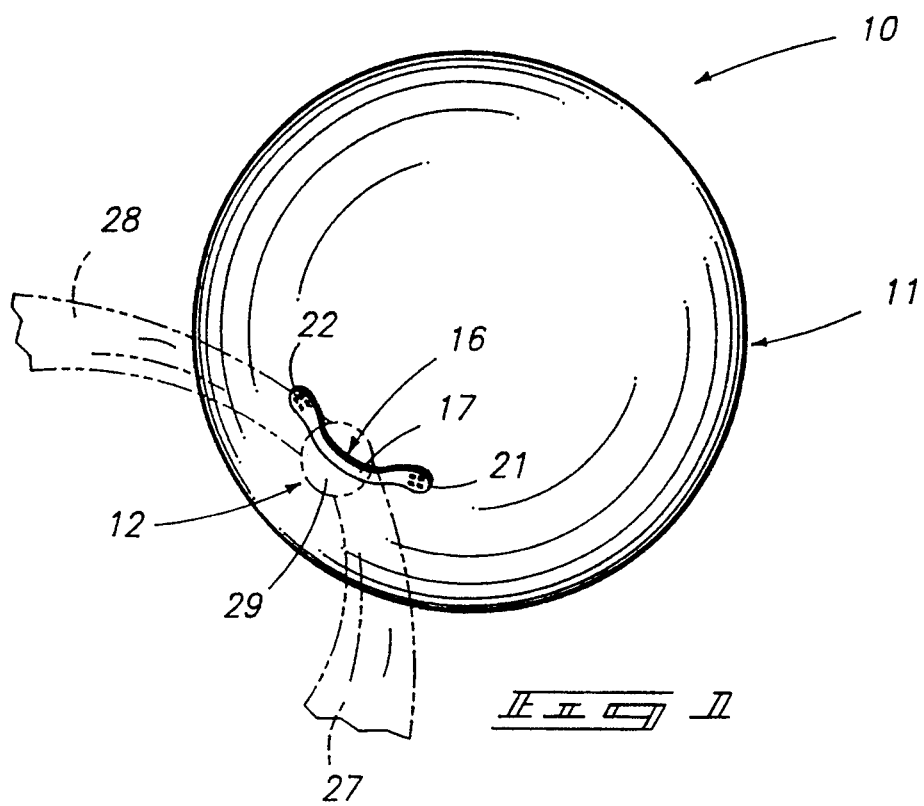
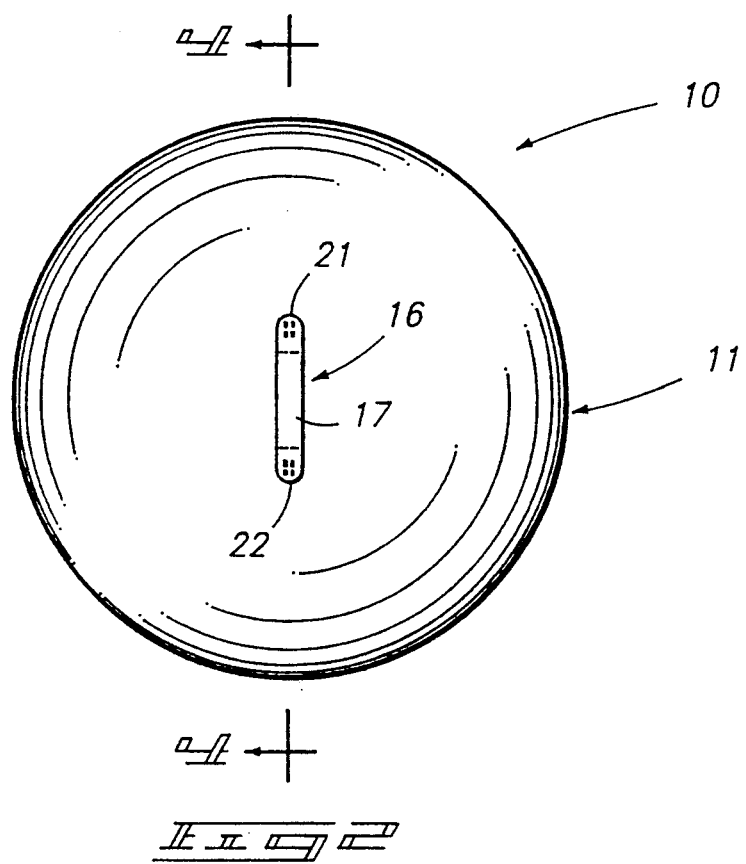

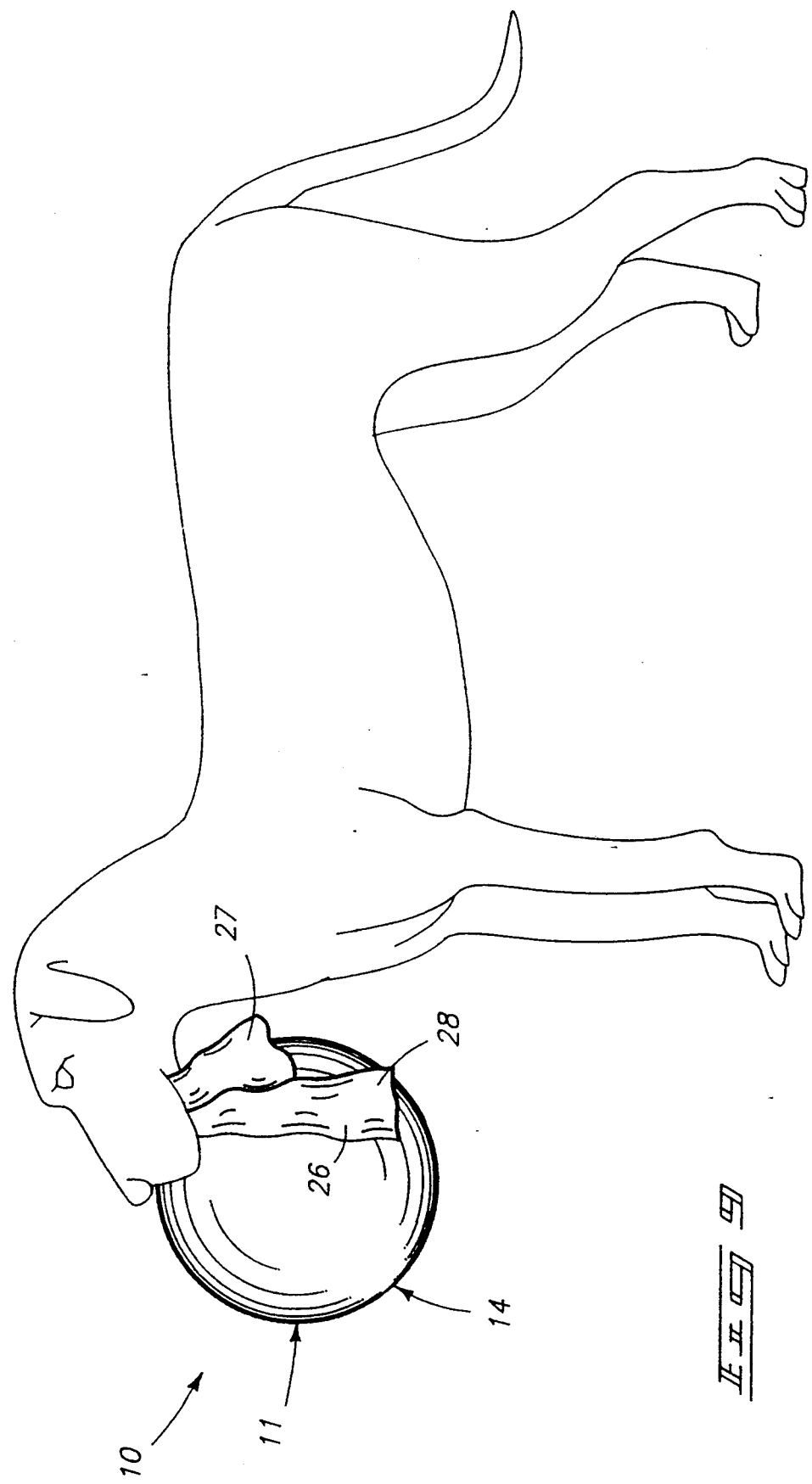

BALL AND FLEXIBLE FLAG TAIL PET TOY STIMULATION AND TRAINING APPARATUS

TECHNICAL FIELD

The technical field of this invention is ball toys and training apparatus for pets.

BACKGROUND OF THE INVENTION

Pet owners have previously used several varieties of toys for entertainment and pet training. In particular, owners of dogs and cats have used pet toys for entertainment and training. Balls have been used for throwing and retrieving. A variety of actual and simulated bones have also been used as retrieving toys for pets. However, these and other pet toys have not provided a high degree of visual activity which accentuates the attractiveness of the toy to a pet. Some prior art pet toys have also been difficult for pets to retrieve. The use of toy balls has significantly been limited to relatively small balls which can be grasped in the mouth of the dog, cat or other pet. This limitation of pet balls to a relatively small size has also limited the ability of pets to visually perceive the balls. Small balls furthermore are easily lost and more difficult to find. Thus there remains a need for an improved pet ball toy which can be more easily retrieved and sighted by the pet and pet trainer.

There is also a continuing need for pet toys which provide a higher level of pet interest. This is particularly true for pet trainers interested in developing greater pet skills and intelligence in a shorter time frame. Many prior art pet toys prove interesting for only limited periods of time and thus do not maintain interest and limit the effectiveness of the toy as an educational and skills training tool.

The current invention provides a number of advantages not demonstrated by prior art pet toys. Additional benefits and advantages are described herein or are apparent from the description of the invention given herein.

BRIEF DESCRIPTION OF THE DRAWINGS

One or more preferred forms of the invention are described herein with reference to the accompanying drawings. The drawings are briefly described below.

FIG. 1 is a perspective view showing a preferred embodiment of pet toy made according to this invention. The invention includes both a ball assembly portion and a tail assembly portion shown in phantom lines for ease of illustration.

FIG. 2 is a front elevational view of a ball assembly portion used in the pet toy shown in FIG. 1.

FIG. 9 is a pictorial view showing how the pet toy of FIG. 1 is typically used by a pet.

DETAILED DESCRIPTION OF THE PREFERRED EMBODIMENTS

Figure 3:
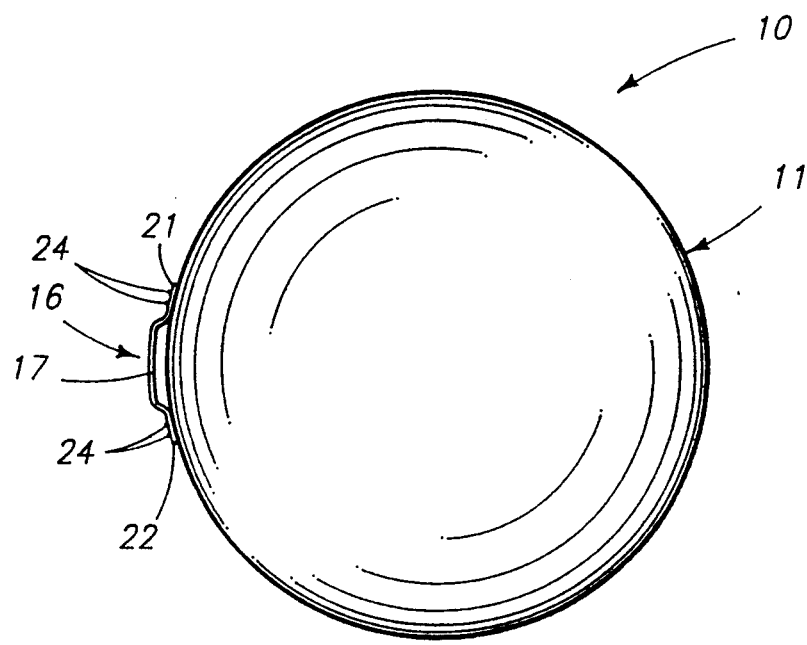
FIG. 3 is left side elevational view of the ball assembly portion shown in FIG. 1.
Figure 4:
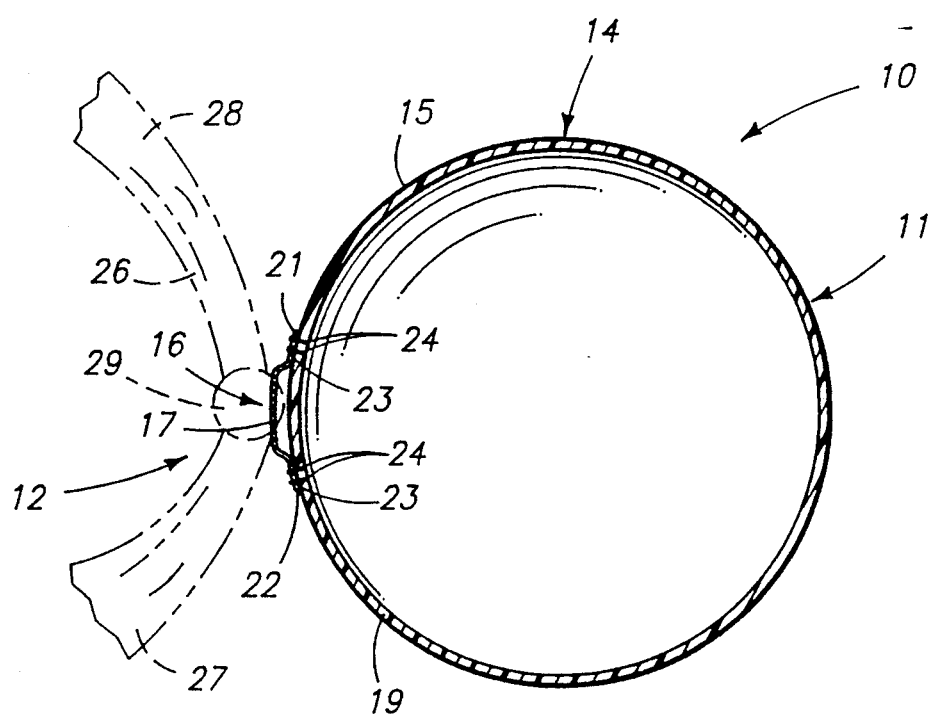
FIG. 4 is a sectional view of the ball assembly portion shown in FIG. 1 with a tail assembly portion shown pictorially in phantom.
Figure 5:
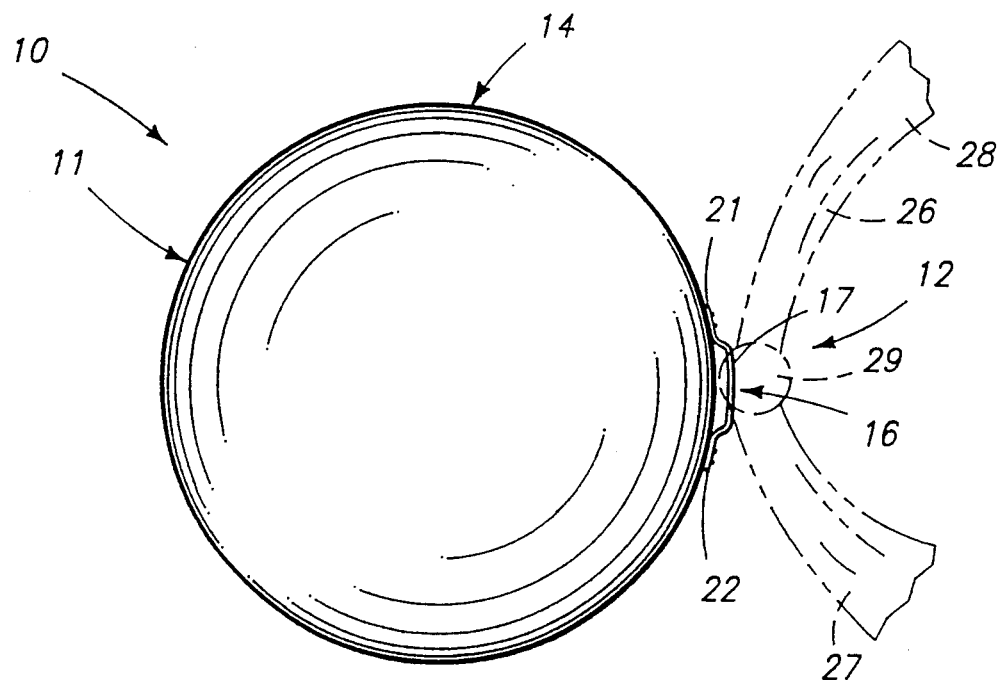
FIG. 5 is a right side elevational view of the ball assembly portion shown in FIG. 1.
Figure 6:
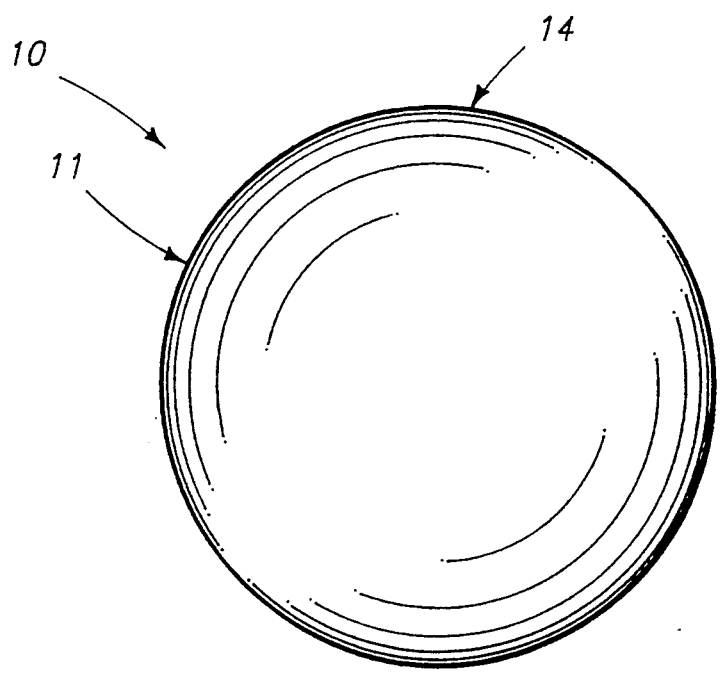
FIG. 6 is a rear view of the pet toy shown in FIG. 1.
Figure 7:
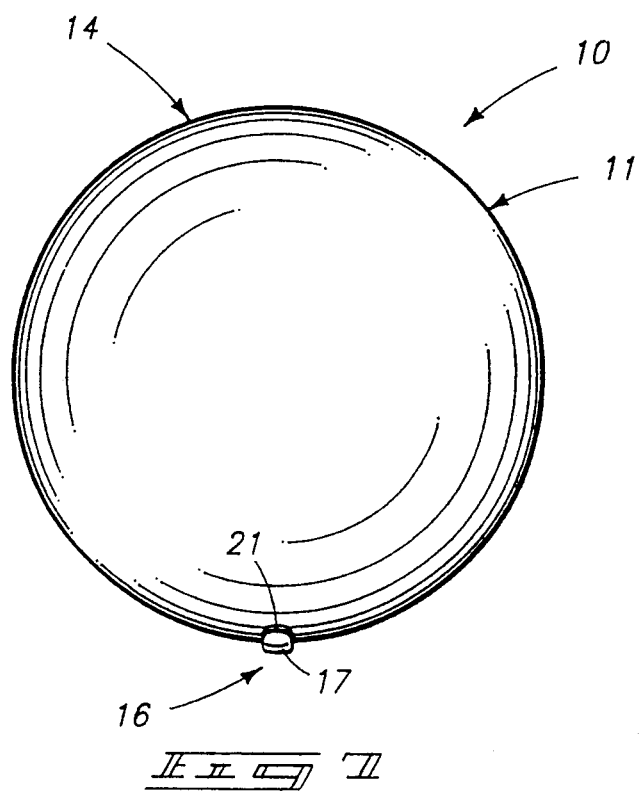
FIG. 7 is a top view of the pet toy shown in FIG. 1.
Figure 8:
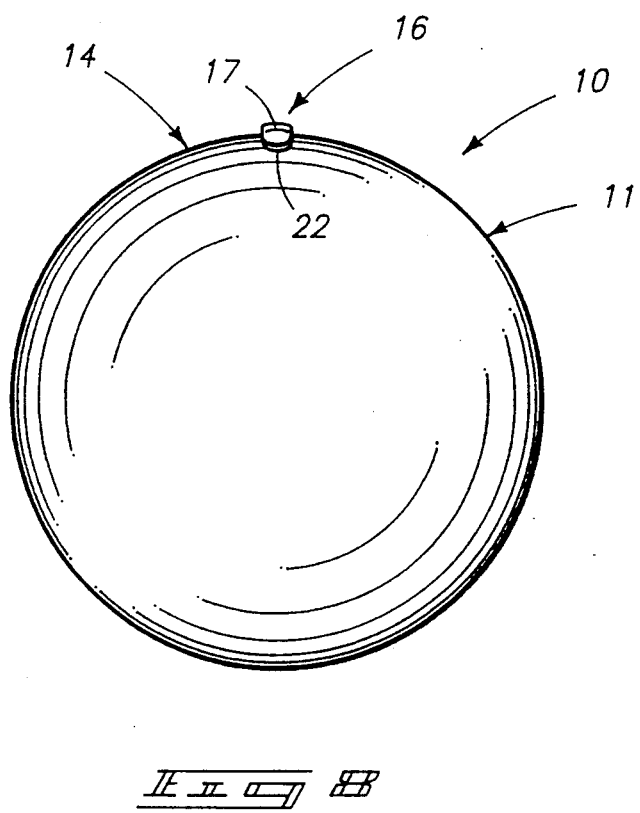
FIG. 8 is a bottom view of the pet toy shown in FIG. 1.

This disclosure of the invention is submitted in furtherance of the constitutional purposes of the U.S. Patent Laws "to promote the progress of science and useful arts" (Article 1, Section 8).

FIG. 1 shows a preferred form of ball and flexible flag tail pet toy and training apparatus 10 made in accordance with this invention. Toy 10 includes a ball assembly portion 11 and a flexible flag tail assembly portion 12. Ball assembly portion 11 includes a ball portion 14 and a tail hold or holdfast 16. Ball portion 14 can be of various forms and sizes. As shown, the preferred ball portion is approximately spherical. The use of a spherical ball portion provides advantages in the visual attractiveness of the toy because the flagging action of the tail assembly is enhanced. The attractiveness of the toy is enhanced by spinning of the ball when in the air, and by rolling action which occurs due to contact of the ball with the ground and other objects.

The ball assembly portion 11 also includes the tail hold or holdfast 16. Tail holdfast 16 provides a support or connection to which the tail assembly 12 is secured. The tail holdfast is preferably in the form of a loop, such as the elongated loop shown in the FIGS. The loop is preferably flexible. In the preferred embodiment shown the holdfast is formed into a loop by affixing a tail hold strap 17 to outer surfaces 15 of the ball portion. This can be done adhesively, using other forms of bonding, or using other suitable means for attaching the tail hold. The hold fast can also be formed as part of the ball wall 19, such as by integrally molding it thereinto. As shown, the tail hold is connected by adhering and sewing the strap at opposing first and second ends 21 and 22 of the tail hold strap. The ends are connected to the ball wall 19 using tail hold bonds 23 and tail hold stitching 24.

The toy and training apparatus 10 further includes tail assembly 12. Tail assembly 12 preferably includes a first tail flag 27 and a second tail flag 28. Tail assembly 12 also includes a tail bulge 29. Bulge 29 is advantageously formed by tying a knot or other bulbous shaped bulge into the tail piece 26. The tail piece is preferably formed from a strip of flexible material, most preferably from a strip of cloth fabric. The cloth fabric or other tail piece 26 is extended through the opening formed by the tail holdfast 16 between the ball 14 and the tail hold strap 17. The tail flags can be of various lengths, for example 6-18 inches. The tail flags can easily be removed for cleaning and/or replacement.

The tail flags create a particularly attractive visual display and keep the pet interested for a long and productive training session. The flagging tail motion makes the toy seem "alive" and greatly stimulates pet interest. As the toy is thrown or rolls across the ground the tail flags dance with activity creating intense interest and desire in the pet to pursue the toy. The tails also provide a means for grabbing the toy by both pet and trainer. The tails can further be used by the trainer to hurl the toy longer distances. The tail assembly bulge 29 provides a tail assembly part which can easily be taken by the pet into its mouth and serves as an advantageous surface handle. The pet grasps the surface-exposed knot with jaws and teeth positioned on the knot. The surface knot provides for comfortable and controlled carrying. This provides a distinct advantage in that it allows pets to carry, play or retrieve a ball of far larger size than what they might otherwise hold between their jaws.

This enhanced ability to carry a larger ball is an ego booster and a great inducement for longer and more productive training sessions. Pets readily learn to grasp the toy in the manner indicated.

The toy is used by throwing it in any suitable manner for retrieval by the pet. The pet then grasps the toy by the surface exposed bulge 29 as explained above. The pet can then carry the ball to the trainer or as a toy in a parade-like manner. Dogs have further demonstrated the great entertainment and educational value of this toy by learning to throw the toy from their mouths by hanging onto the tails and flinging it with a rapid sideways head motion. Both people and pets enjoy playing with this toy.

The invention can be made in a variety of configurations and sizes using a variety of materials, such as leather, rubber, plastic and others. Typically sized range from 1.5–9 inches in diameter. The ball can be made using typical methods of fabrication. The tail hold strap 17 can be made of a variety of materials. It can be integrally formed or affixed to the ball is a suitable manner such as by adhesives, rivets, sewing or other suitable means. The toy is then provided with a tail assembly. This is preferably done by preparing a rectangular piece of cloth fabric to function as the tail strip 26 which is fed through the opening formed between the ball and tail hold strap 17. The tail strip is then tied into a knot one or more times to both secure the tail strip to the tail holdfast 16 and form the tail bulge 29.

In compliance with the statute, the invention has been described in language necessarily limited in its ability to properly convey the conceptual nature of the invention. Because of this inherent limitation of language, it must be understood that the invention is not necessarily limited to the specific features described, since the means herein disclosed comprise merely preferred forms of putting the invention into effect. The invention is, therefore, claimed is any of its forms or modifications within the proper scope of the appended claims appropriately interpreted in accordance with the doctrine of equivalents.

I claim:

1. A pet toy and training apparatus, comprising:
   a ball portion;
   a loop shaped tail holdfast connected to the ball portion;
   at least one flexible tail secured to the tail holdfast;
   said at least one flexible tail being made of a strip of fabric material; said strip of fabric material being tied into a knot about said a loop shaped tail holdfast to form a tail bulge adjacent the tail holdfast.

2. A pet toy and training apparatus according to claim 1 and further defined by said ball portion being approximately spherical.

3. A pet toy and training apparatus according to claim 1 wherein the at least one flexible tail is tied to provide two flagging tails which extend from the knot.

4. A pet toy and training apparatus according to claim 1 wherein said tail holdfast is made of a flexible material.

5. A pet toy and training apparatus according to claim 1 and further defined by a tail bulge formed as a knot of the at least one flexible tail about the tail holdfast.

6. A pet toy and training apparatus according to claim 1 wherein the tail holdfast forms a partial loop of flexible material.

7. A pet toy and training apparatus according to claim 1 and further defined by said tail holdfast being a loop secured to a ball wall forming outer surfaces of said ball portion.

8. A pet toy and training apparatus according to claim 1 and further defined by said tail holdfast being a flattened loop secured at opposing first and second ends thereof to a ball wall forming outer surfaces of said ball portion.

9. A pet toy and training apparatus according to claim 1 wherein said tail holdfast is a strap.

10. A pet toy and training apparatus according to claim 1 wherein said tail holdfast is a flattened loop secured at opposing first and second ends thereof to a ball wall forming outer surfaces of said ball portion.

11. A pet toy and training apparatus according to claim 1 wherein the tail holdfast is an elongated strap connected at opposing ends to the ball portion.

12. A pet toy and training apparatus according to claim 1 wherein the tail holdfast is an elongated strap made of flexible material.

13. A pet toy and training apparatus, comprising:
    a ball portion;
    a loop shaped tail holdfast connected to the ball portion;
    at least one at least one flexible tail secured to the tail holdfast; said flexible tail being made from a strip of cloth fabric material;
    a tail bulge formed in the at least one flexible tail adjacent to the tail holdfast.

14. A pet toy and training apparatus according to claim 13 and further defined by said ball portion being approximately spherical.

15. A pet toy and training apparatus according to claim 13 wherein the at least one flexible tail is tied to provide two flagging tails.

16. A pet toy and training apparatus according to claim 13 wherein said tail bulge is formed as a knot in the flexible tail about the tail holdfast.

17. A pet toy and training apparatus according to claim 13 and further defined by said loop shaped tail holdfast being a flattened loop secured at opposing first and second ends thereof to a ball wall forming outer surfaces of said ball portion.

18. A pet toy and training apparatus according to claim 13 wherein the at least one flexible tail is tied into a knot about the loop shaped tail holdfast to form the tail bulge adjacent the tail holdfast.

19. A pet toy and training apparatus according to claim 13 wherein the at least one flexible tail is tied into a knot about the loop shaped tail holdfast to form the tail bulge adjacent the tail holdfast; said tail holdfast being a flattened loop secured at opposing first and second ends thereof to a ball wall forming outer surfaces of said ball portion.

20. A pet toy and training apparatus according to claim 13 wherein said tail holdfast in made of flexible material.

21. A pet toy and training apparatus according to claim 13 wherein the tail holdfast forms a partial loop of flexible material.

22. A pet toy and training apparatus according to claim 13 wherein the tail holdfast is secured to a ball wall forming outer surfaces of said ball portion.

23. A pet toy and training apparatus according to claim 13 wherein the tail holdfast is a strap.

24. A pet toy and training apparatus according to claim 13 wherein the tail holdfast is an elongated strap connected at opposing ends to the ball portion.

25. A pet toy and training apparatus according to claim 13 wherein the tail holdfast is an elongated strap made of flexible material.

26. A pet toy and training apparatus, comprising:
a ball portion;
a tail holdfast connected to the ball portion;
at least one flexible tail secured to the tail holdfast; said at least one flexible tail being made of a flat strip of material; said strip of material being tied to the tail holdfast;
an enlarged tail bulge formed adjacent the tail holdfast upon said at least one flexible tail.

27. A pet toy and training apparatus according to claim 26 and further defined by said ball portion being approximately spherical.

28. A pet toy and training apparatus according to claim 26 wherein the flexible tail is tied to provide two flagging tails which extend from the knot.

29. A pet toy and training apparatus according to claim 26 wherein said tail holdfast is made of a flexible material.

30. A pet toy and training apparatus according to claim 26 and further defined by said tail bulge formed as a knot of the flexible tail about the tail holdfast.

31. A pet toy and training apparatus according to claim 26 wherein said tail holdfast forms a partial loop of flexible material.

32. A pet toy and training apparatus according to claim 26 and further defined by said tail holdfast being a loop secured to a ball wall forming outer surfaces of said ball portion.

33. A pet toy and training apparatus according to claim 26 and further defined by said tail holdfast being a flattened loop secured at opposing first and second ends thereof to a ball wall forming outer surfaces of said ball portion.

34. A pet toy and training apparatus according to claim 26 wherein tail holdfast is a strap.

35. A pet toy and training apparatus according to claim 26 wherein the tail holdfast is an elongated strap connected at opposing ends to the ball portion.

36. A pet toy and training apparatus according to claim 26 wherein the tail holdfast is an elongated strap made of flexible material.

* * * * *